United States Patent [19]

Severinsson

[11] Patent Number: 4,498,180
[45] Date of Patent: Feb. 5, 1985

[54] METHOD OF MAINTAINING A PREDETERMINED BEAM DIRECTION IN A LASER PULSE TRANSMITTER AND AN APPARATUS FOR CARRYING OUT THE METHOD

[75] Inventor: Anders S. Severinsson, Lindome, Sweden

[73] Assignee: Telefonaktiebolaget LM Ericsson, Stockholm, Sweden

[21] Appl. No.: 459,976

[22] Filed: Jan. 21, 1983

[30] Foreign Application Priority Data

Jan. 29, 1982 [SE] Sweden ................................ 8200502

[51] Int. Cl.³ ............................................. H01S 3/13
[52] U.S. Cl. ......................................... 372/29; 372/9; 372/69; 372/38
[58] Field of Search ...................... 372/81, 69, 38, 10, 372/29, 26, 22, 16

[56] References Cited

U.S. PATENT DOCUMENTS 3,315,177 4/1967 Benson .................................. 372/16
3,393,374 7/1968 Krumboltz ........................... 378/16
3,548,253 12/1970 Alon .................................... 372/108

Primary Examiner—William L. Sikes
Assistant Examiner—Léon Scott, Jr.
Attorney, Agent, or Firm—Roberts, Spiecens & Cohen

[57] ABSTRACT

The invention relates to a method and an apparatus for maintaining a predetermined beam direction in a laser pulse transmitter having a laser resonator including a laser rod (1) with a rotating prism (2) at one end and output coupler (3) at its other end, as well as a flash lamp (4) which is energized to emit a flash pulse for pumping the laser rod (1) with light energy. In accordance with the invention, the deviation of the beam from the predetermined beam direction is measured with the aid of a measuring circuit (13-18), subsequent to which the working point of the laser pulse transmitter is adjusted in response to the magnitude and polarity of the deviation to a predetermined working point corresponding to the predetermined beam direction, e.g. by altering the flash pulse energy.

10 Claims, 3 Drawing Figures

METHOD OF MAINTAINING A PREDETERMINED BEAM DIRECTION IN A LASER PULSE TRANSMITTER AND AN APPARATUS FOR CARRYING OUT THE METHOD

TECHNICAL FIELD

The present invention relates to a method of maintaining a predetermined beam direction in a laser pulse transmitter having a laser resonator including a laser rod with a rotating prism at one end and an output coupler at its other end, as well as a flash lamp which is energized to emit a flash pulse for pumping the laser rod, as well as to an apparatus for carrying out the method.

BACKGROUND ART

In a laser pulse transmitter the beam direction is displaced due to variations in the ambient temperature as well as aging of the lamp and the laser resonator. Aging may appear in the form of a deposit on the optical surfaces of the laser resonator, for example.

Variations in ambient temperature have so far been compensated with the aid of thermistors for varying the pump energy emitted by the flash lamp in response to the temperature.

So fat it has not been possible to compensate the deviation of the beam direction resulting from aging of the lamp and/or laser resonator.

DISCLOSURE OF INVENTION

The object of the present invention is to provide a method and an apparatus for compensating the deviation of the beam direction resulting from temperature variations as well as aging of the flash lamp and the laser resonator.

This is achieved by the method and apparatus in accordance with the invention being given the characterizing features disclosed in the claims.

BRIEF DESCRIPTION OF DRAWINGS

The invention will now be described in detail below, with reference to the appended drawing, on which FIGS. 1, 2 and 3 respectively illustrate a first, a second and a third embodiment of an apparatus in accordance with the invention.

BEST MODES FOR CARRYING OUT THE INVENTION

Figure 1:
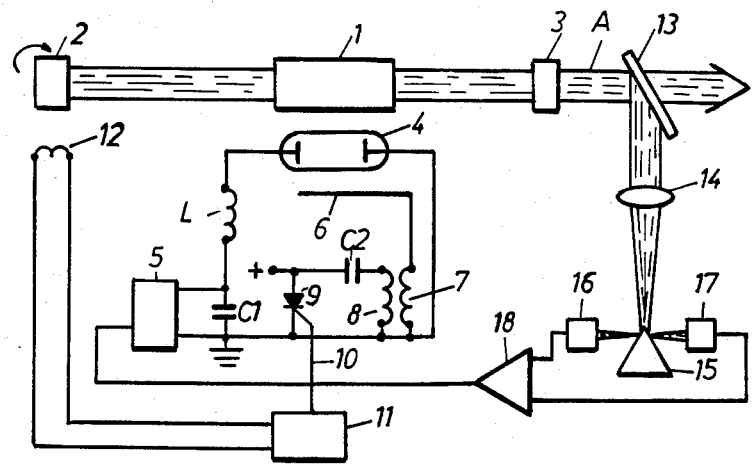

FIG. 1 illustrates a laser pulse transmitter with a first embodiment of the apparatus in accordance with the invention for maintaining a predetermined beam direction from the laser pulse transmitter. This includes a laser resonator, in turn including a laser rod 1 with a rotating prism 2 at one end and an output coupler of mirror 3 at its other end, and a flash lamp 4 which is energized with the aid of an energizing circuit to emit a flash pulse for pumping the laser rod 1 with light energy for generating a laser pulse from the laser resonator. The flash pulse energy is obtained from a capacitor C1 connected in parallel with the flash lamp 4 and which is charged to a desired voltage, e.g. one kV, with the aid of a high-tension unit 5. A choke coil L is connected in series with the flash lamp 4 and the capacitor C1. The energizing circuit for energizing the flash lamp 4 is known per se, and includes a triggering wire 6 extending along the lamp 4, the wire being connected to one end of the secondary winding 7 of a transformer, the primary winding 8 of which in series with a capacitor C2 is connected in parallel with a thyristor 9 between ground and the positive pole of a DC source not shown. The flash lamp 4 is energized by the thyristor 9 being triggered by means of a pulse at its gate 10, an energizing pulse then occurring on the triggering wire 6. As the lamp fires the capacitor C1 begins to be discharged via the lamp 4 and choke coil L and the flash pulse begins to occur.

In the embodiment illustrated in FIG. 1 the gate 10 of the thyristor 9 is assumed to be connected to a triggering circuit 11 receiving information in respect of the triggering instant from a sensor 12, e.g. a sensing coil, in response to the angular position of the rotating prism 2. In this case the prism is provided with an unillustrated permanent magnet which is sensed by the coil. The intention is that the flash pulse from the flash lamp 4 shall occur when there is coincidence in the optical axes of the elements included in the laser resonator, i.e. the laser rod 1, the rotating prism 2 and the output coupler 3.

Figure 2:
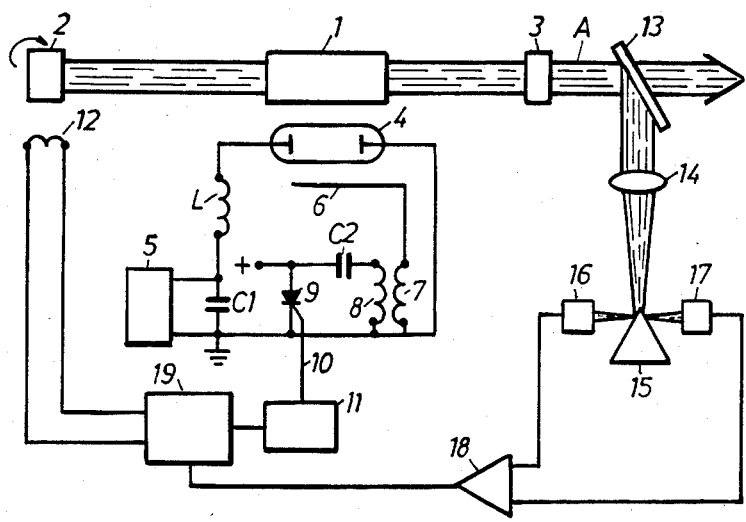
Figure 3:
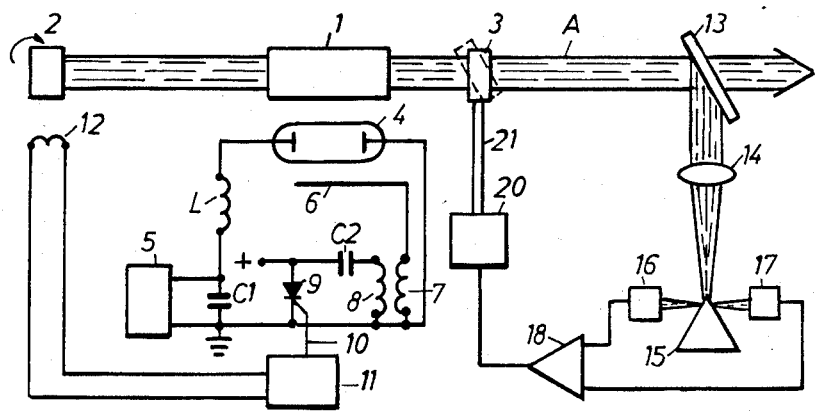

As mentioned in the introduction, the beam direction of the laser pulse transmitter can change due to aging of the flash lamp and/or the components included in the laser resonator. The working point of the laser pulse transmitter is thus altered. To compensate for this alteration of the working point of the laser pulse transmitter, there is proposed in accordance with the invention that the beam deviation from the predetermined beam direction is measured, and in reponse to the magnitude and polarity of the deviation the working point of the laser pulse transmitter is adjusted to a predetermined working point corresponding to the predetermined beam direction. In FIGS. 1, 2 and 3 there are illustrated three different embodiments of an apparatus for carrying out this adjustment of the working point of the laser pulse transmitter.

Common to all three embodiments are the means denoted by 13-18 for measuring the magnitude and polarity of the deviation. A beam splitter 13 serves for deflecting a portion of the laser beam A towards a convex lens 14, at the focus of which a roof edge prism 15 is placed for deflecting portions of the incident light beam towards respective photo detectors 16 and 17, which are adapted to supply their respective output signals in response to the light quantity incident on the respective detector. The roof edge prism 15 is placed such that each half of the incident light beam is deflected when the beam direction coincides with the predetermined beam direction. In this case the output signals from the detectors 16 and 17 will be equally great. This is determined in the illustrated embodiment with the aid of an operational amplifier 18 connected to both detectors 16 and 17, said amplifier being adapted to supply an output signal in response to the magnitude and polarity of the difference between the signals from the detectors 16 and 17.

In the embodiments of the apparatus in accordance with the invention illustrated in FIGS. 1, 2 and 3, the output signal of the operational amplifier 18 is utilized in three different ways for adjusting the working point of the laser pulse transmitter to a working point corresponding to the desired predetermined beam direction.

In the embodiment illustrated in FIG. 1, the working point of the laser pulse transmitter is altered by changing the flash pulse energy. This is achieved by the capacitor C1 being charged to a higher or lower voltage with the aid of the high-tension unit 5, in response to the magnitude of the output signal from the operational amplifier 18. The high-tension unit 5 is thus controlled by the operational amplifier 18. For example, as the flash pulse energy increases, the pump energy to the laser rod 1 also increases, whereby the beam direction of the laser pulse transmitter is altered. The working point of the laser pulse transmitter will thus be shifted to the working point corresponding to the predetermined beam direction. When the working point has assumed its predetermined position, the beam direction will be in agreement with the predetermined beam direction and the difference between the output signals of the detectors 16 and 17 will be equal to zero.

In the embodiment illustrated in FIG. 2, a controllable delay circuit 19 is connected between the sensor 12 and the triggering circuit 11. The delay circuit 19 is connected to the output of the operational amplifier 18 and is adapted to control the triggering of the thyristor 9 so that the flash lamp 4 pumps the laser rod 1 at the right instant, i.e. when the rotating prism 2 and output coupler 3 forms a laser resonator together with the laser rod 1. The firing of the flash lamp 4 is thus controlled in the embodiment according to FIG. 2 in response to the angular position of the rotating prism 2.

In the embodiment illustrated in FIG. 3, the operational amplifier 18 is connected to a stepping motor 20, the output shaft 21 of which is adapted to turn the output coupler 3 in response to the magnitude and polarity of the operational amplifier signal. In this case the optical axis of the laser resonator is altered by altering the optical axis of the output coupler 3. It is of course possible to alter the optical axis of the laser rod 1 and the rotating prism 2 instead, for adjusting the beam direction.

To one skilled in the art, it should be obvious that the deviation of the beam direction from the predetermined beam direction can be measured in several different ways, even if only a single embodiment of the measuring circuit itself has been described. Instead of the roof edge prism 5 and the photodetectors 16 and 17 one could use, for example, a split planar photodetector placed such that both parts each receives a half of the light beam focused by the lens 14 as long as the beam direction agrees with the predetermined beam direction.

What is claimed is:

1. A method of maintaining a predetermined beam direction in a laser pulse transmitter having a laser resonator including a laser rod (1) with a rotating prism (2) at one end and an output coupler (3) at its other end, a flash lamp (4) which is energized to emit a flash pulse for pumping the laser rod (1), comprising measuring deviation of the beam from the predetermined beam direction, and adjusting in response to the magnitude and polarity of the deviation, a working point of the laser pulse transmitter to a working point corresponding to the predetermined beam direction.

2. A method as claimed in claim 1, characterized in that the working point of the laser pulse transmitter is adjusted by altering the flash pulse energy.

3. A method as claimed in claim 1, characterized in that the working point of the laser pulse transmitter is adjusted by altering the energizing instant of the flash lamp in response to the angular position of the rotating prism (2).

4. A method as claimed in claim 1, characterized in that the working point of the laser pulse transmitter is adjusted by altering the optical axis of the laser resonator.

5. A method as claimed in claim 4, characterized in that the optical axis of the laser resonator is altered by altering the optical axis of either the output coupler (3) or the laser rod (1) or the rotating prism (2).

6. An apparatus for maintaining a predetermined beam direction in a laser pulse transmitter comprising laser resonator including a laser rod (1) with a rotating prism (2) at one end and an output coupler (3) at its other end, a flash lamp (4) emitting a flash pulse for pumping the laser rod (1), and a measuring circuit (13-18) measuring deviation of the beam from the predetermined beam direction and supplying a signal, corresponding to the magnitude and polarity of the deviation to an adjusting circuit (5; 19; 20) adjusting the working point of the laser pulse transmitter in response to this signal to a working point corresponding to the predetermined beam direction.

7. An apparatus as claimed in claim 6, wherein the adjusting circuit (5) includes means for adjusting the working point of the laser pulse transmitter by altering the flash pulse energy.

8. An apparatus as claimed in claim 6, wherein the adjusting circuit (19) includes means to adjust the working point of the laser pulse transmitter by altering the energizing instant of the flash lamp (4) in response to the angular position of the rotating prism (2).

9. An apparatus as claimed in claim 6, wherein the adjusting circuit (20) includes means for adjusting the working point of the laser pulse transmitter by altering the optical axis of the laser resonator.

10. An apparatus as claimed in claim 9, wherein the means of adjusting circuit (20) adjust the optical axis of either the output coupler (3) or the laser rod (1) or the rotating prism (2).

* * * * *